US007525101B2

(12) United States Patent
Grodzins

(10) Patent No.: US 7,525,101 B2
(45) Date of Patent: Apr. 28, 2009

(54) NEUTRON AND GAMMA RAY MONITOR

(75) Inventor: Lee Grodzins, Lexington, MA (US)

(73) Assignee: Thermo Niton Analyzers LLC, Billerica, MA (US)

( * ) Notice: Subject to any disclaimer, the term of this patent is extended or adjusted under 35 U.S.C. 154(b) by 166 days.

(21) Appl. No.: 11/442,638

(22) Filed: May 26, 2006

(65) Prior Publication Data
US 2007/0272874 A1 Nov. 29, 2007

(51) Int. Cl.
G01T 3/06 (2006.01)
(52) U.S. Cl. .................................. 250/390.11
(58) Field of Classification Search ............. 250/390.11
See application file for complete search history.

(56) References Cited

U.S. PATENT DOCUMENTS

| 5,231,290 | A | 7/1993 | Czirr et al. |
| 5,481,114 | A | 1/1996 | Daniel et al. |
| 5,880,469 | A | 3/1999 | Miller |
| 6,393,085 | B1 | 5/2002 | Heller et al. |
| 6,529,573 | B2 | 3/2003 | Olsher et al. |
| 6,566,657 | B2 | 5/2003 | Odom et al. |
| 2001/0046274 | A1 | 11/2001 | Craig et al. |
| 2005/0023479 | A1 | 2/2005 | Grodzins |

FOREIGN PATENT DOCUMENTS

GB  2 149 193 A  6/1985

OTHER PUBLICATIONS

"The New Standard in Portable Alloy Analysis Instrumentation," Niton Product Brochure for XLi 800 and XLt 800, Apr. 2002.
"The World Standard in Portable XRF Spectroscopy," Product Brochure for Niton Analyzers, 2004.
Knoll, Glenn F., "Chapter 10: Radiation Spectroscopy with Scintillators," In Radiation Detection and Measurement, Third Edition, Zobrist, et al., eds. (NY: John Wiley & Sons, Inc.) pp. 307-352 (2000).
Knoll, Glenn F., "Chapter 14: Slow Neutron Detection Methods," In Radiation Detection and Measurement, Third Edition, Zobrist, et al., eds. (NY: John Wiley & Sons, Inc.) pp. 505-535 (2000).
"Detecting Arsenic in Soil Using Field Portable X-Ray Fluorescence (XRF)," Niton Case Study, pp. 1-2, May 2000.
"Minneapolis Offers Free Soil Testing to Raise Public Awareness of Lead Hazards," Niton Case Study, pp. 1-2, Dec. 2000.

(Continued)

Primary Examiner—David P Porta
Assistant Examiner—Shun Lee
(74) Attorney, Agent, or Firm—Hamilton, Brook, Smith & Reynolds; Charles B. Katz

(57) ABSTRACT

An apparatus for selective radiation detection includes a neutron detector that facilitates detection of neutron emitters, e.g. plutonium, and the like; a gamma ray detector that facilitates detection of gamma ray sources, e.g., uranium, and the like. The apparatus comprises a first light guide, optically coupled to a first optical detector; a second light guide, optically coupled to a second optical detector a sheet of neutron scintillator, opaque for incoming optical photons, said sheet of neutron scintillator sandwiched between the first and the second light guides. The second light guide comprises a gamma ray scintillator material.

20 Claims, 4 Drawing Sheets

OTHER PUBLICATIONS

"California DHS Validates New method for Soil Testing," Niton Case Study, pp. 1-2 Jun. 2001.
"Portable Alloy Analysis: Charting a New Course to the Future," Niton Product Brochure for XL*i* 800 and XL*t* 800, Apr. 2002.
"Metal Analysis Made Fast and Simple: Charting a New Course to the Future," Niton Product Brochure for XL*i* 500 and XL*t* 500, May 2003.
Miller M. C. et al., "Design of a Fast Neutron Coincidence COunter," Applied Radiation and Isotopes, Elsevier (Oxford, GB), vol. 48 (10-12), pp. 1549-1555, (1997).

NEUTRON AND GAMMA RAY MONITOR

BACKGROUND OF THE INVENTION

With the rise of terrorism there is a growing need for effective detectors for radioactive weapons of mass destruction, or materials used to shield their radiation form detection, e.g., high atomic weight elements. Three weapons of special concern are so-called "dirty bombs", uranium-based atomic bombs, and plutonium-based atomic bombs. For example, dirty bombs include chemical explosives surrounded by radioactive materials to be dispersed upon detonation, contaminating the surroundings. Dirty bombs can be detected by their emitted radiation, gamma and bremsstrahlung radiation being the most common signatures. Uranium-based atomic bombs can in principle be identified by the signature gamma rays of $^{235}$U or $^{238}$U. The radiation flux from weapons-grade $^{235}$U is low, and therefore excellent efficiency and good energy resolution is desirable to distinguish $^{235}$U or $^{238}$U signature gamma rays from background gamma rays and from innocent sources. Plutonium-based atomic bombs can be detected by neutron emission. Neutron emitters are sufficiently rare that the detection of a neutron source several times above neutron background levels can be prima facie evidence for the presence of plutonium.

The detection of gamma rays and neutrons has a long history dating from their discoveries. Many topical books and monographs are available, for example, "Radiation Detection and Measurement", Third Edition, 1999 by Glenn F. Knoll, Wiley Press, the entire teachings of which are incorporated herein by reference. Until recently, radiation detectors were used almost exclusively for benign commercial or research applications. Gamma ray devices with good efficiency and energy resolution have been available since NaI(Tl), the most widely used inorganic scintillator, was introduced in the late 1940's. There are now a number of inorganic and organic scintillators, as well as a number of semiconductor detectors, such as high-purity germanium, that are commercially available for detecting gamma rays of low and high energy in configurations adapted for a variety of applications. Light from the scintillators can be detected by an optical detector, e.g., photomultipliers, photodiodes, and charge-coupled devices (CCDs) and the like. However, these detectors cannot detect gamma ray sources shielded by a sufficient mass of a high Z material, e.g., lead, tungsten, and the like. Commercial neutron detectors also became available in the early 1960s. These relatively bulky devices detect thermal neutrons are typically detected with gas-proportional counters filled with either $BF_3$ or $^3$He. High energy neutrons can typically be measured by plastic and liquid scintillators that detect the highly ionizing protons produced when the energetic neutrons collide elastically with the hydrogen nuclei. The presence of fast neutrons can also be determined by thermalizing, or moderating the speed of the neutrons with a hydrogenous material, and detecting the resulting thermal neutrons with efficient thermal neutron detectors. Plastic and liquid scintillator containing lithium or boron are examples of detectors that employ this method.

SUMMARY OF THE INVENTION

Existing commercial radiation detectors continue to be based on the neutron and gamma detection technologies developed more than 40 years ago. Advances have been almost entirely in the electronic packaging and the computer-based analysis of the information. Available detector technologies still do not meet, in a cost-effective manner, Homeland Security needs for radiological weapons detection, including selectivity, efficiency, portability, and detection of the three main types of radioactive weapons. Therefore, there is a need for more effective detectors of radioactive weapons of mass destruction, including shielded weapons.

In various embodiments of the invention, an apparatus includes a new-type of neutron detector that facilitates detection of neutron emitters, e.g. plutonium, and the like; a gamma ray detector that facilitates detection of gamma ray sources, e.g., uranium, and the like.

Penetrating neutron radiation and gamma rays can be selectively detected, and thus distinguished, by employing an apparatus of the present invention. The apparatus can comprise a first light guide, a second light guide, and a sheet of neutron scintillator, opaque for incoming optical photons, sandwiched between the first and the second light guides. The first light guide can be optically coupled to a first optical detector and the second light guide can be optically coupled to a second optical detector. The second light guide can comprise a gamma ray scintillator material.

The light guides can thermalize fast neutrons so that they are captured by the neutron scintillator, producing optical light. The thermalizing light guides can comprise a hydrogenous material that thermalizes fast neutrons. For example, light guides can include at least one material selected from water, organic solvents, mineral oil, and organic polymers.

The neutron scintillator can comprise a thermal neutron capturing isotope component and a scintillation component that scintillates upon exposure of the capturing isotope to thermal neutrons. Examples of the capturing isotope include $^6$Li, $^{10}$B, $^{113}$Cd, and $^{157}$Gd. Examples of the neutron scintillator component include $^6$LiF and ZnS.

The gamma ray scintillator can comprise a material selected from hydrogenous material such as plastic or liquid scintillators, or inorganic scintillators such as NaI(Tl), CsI(Tl), BGO, $BaF_2$, LSO, and $CdWO_4$.

The apparatus can further comprise a processor that indicates coincidence of the signals from the first optical detector and the second optical detector. The device classifies the detected radiation as neutrons if the processor indicates coincidence of the signals from the first optical detector and the second optical detector. Gamma rays can be detected if the processor indicates the signal from the second optical detector, but not a simultaneous signal from the first optical detector.

The apparatus can further comprise a display coupled to the processor to display radiation detection results.

The apparatus can be adapted to be handheld.

The apparatus can further include plural neutron scintillator sheets interleaving plural light guide plates.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
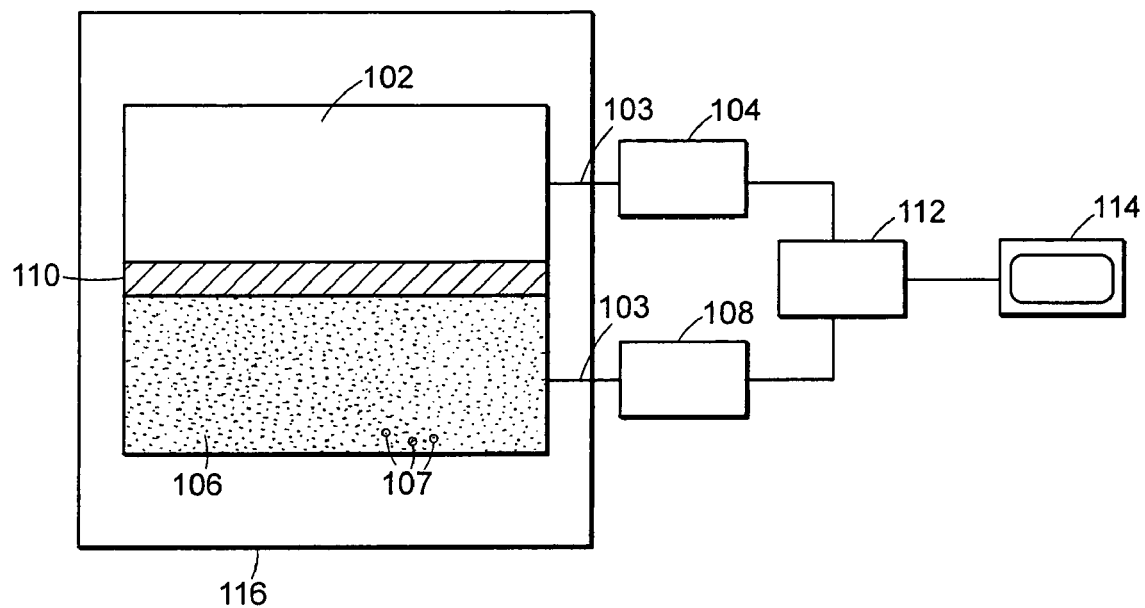
FIG. 1 is a schematic diagram of one embodiment of the device of the present invention.

FIG. 1 depicts an embodiment of selective radiation detection apparatus 100 equipped to detect gamma rays and neutrons. Neutron scintillator sheet 110, opaque for incoming optical photons, is sandwiched between the first light guide 102 and the second light guide 106. The second light guide 106 comprises a gamma ray scintillator material 107. Optical detector 104 is coupled to the first light guide 102 either directly or, as shown in FIG. 1, by optional optical fibers 103. Optical detector 104 is configured to detect scintillation from neutron scintillator sheet 110 guided through light guide 102. Optical detector 108 is coupled to light guide 106. Similarly to optical detector 104, optical detector 108 can be coupled to the first light guide 102 either directly or, as shown in FIG. 1, by optional optical fibers 103. Apparatus 100 can optionally be covered by moderator 116, which can be a material that further enhances the thermalization of fast neutrons.

Detectors 104 and 108 can be coupled to processor 112 which can provide data acquisition, control, and output. Output can be accomplished by display 114.

In operation of device 100, if the device is exposed to neutron radiation, neutron scintillator sheet 110 generates optical photons that are propagated through optical guides 102 and 106 to first optical detector 104 and second optical detector 108 and, accordingly, processor 112 indicates coincidence of the signals from the first optical detector and the second optical detector. Thus, the detected radiation is classified as neutrons if processor 112 indicates coincidence of the signals from optical detector 104 and optical detector 108. When device 100 is exposed to gamma radiation, gamma ray scintillator material 107 within light guide 106 can generate a flux of optical photons of the same magnitude as that from the neutron interaction in sheet 110. Because neutron scintillator sheet 110 is opaque for incoming optical photons, the optical photons generated in response to gamma radiation will be propagated only through light guide 106 and will be detected by second optical detector 108, but not by first optical detector 104. Processor 112 will not indicate a coincidence of the signals from the first optical detector and the second optical detector. Thus, the detected radiation is classified as gamma rays if the processor 112 indicates the signal from optical detector 108, but not from optical detector 104.

In some embodiments, when device 100 is exposed to gamma radiation, there will be some interactions leading to scintillation light in both neutron scintillator sheet 110 and light guide 106 that contains scintillation material. The response in neutron scintillator sheet 110 is very weak compared to the response from a neutron interaction and can be easily discriminated away as described in U.S. patent application Ser. No. 10/861,332, now published as U.S. Patent Application Publication 20050023479.

Processor 112 can be easily adapted from electronic controllers known to the art for handheld radiation detection instrumentation, for example, the acquisition, control and display system in a commercial X-ray fluorescent unit (Xli, Niton LLC, Billerica, Mass.). Typically, apparatus 100 is adapted to be handheld, e.g., all components can be included in a single compact unit having a total mass less than about 2.5 kg, or more typically, less than about 1.5 kg.

Neutron scintillator 110 has a high efficiency for stopping thermal neutrons and generating optical photons that are emitted from both faces of the scintillation sheet. As used herein, thermal neutrons are neutrons that have kinetic energy on the order of kT, where k is Boltzman's constant and T is the ambient temperature in Kelvin; fast neutrons are neutrons with kinetic energy greater that kT, typically much greater, e.g., in the range of thousands to millions of electron volts. Typically, the material of neutron scintillator 110 can have excellent efficiency for detecting thermal neutrons and negligible efficiency for detecting X-rays or gamma rays. This material can include a thermal neutron-capturing isotope coupled to a scintillation component that scintillates upon exposure of the capturing isotope to thermal neutrons. The capturing isotope can be any thermal neutron capturing isotope known to the art, for example, $^6$Li, $^{10}$B, $^{113}$Cd, $^{157}$Gd, and the like, generally $^6$Li or $^{10}$B, or more typically $^6$Li. The scintillation component can be any component known to the art to scintillation in response to the reaction products of thermal neutron capture by a capturing isotope, for example, the scintillation component can be ZnS. The material of neutron scintillator 110 can be any combination of capturing isotope and scintillation component, for example, a compound including at least one of $^6$Li, $^{10}$B, $^{113}$Cd, or $^{157}$Gd combined with ZnS. Typically, the neutron scintillator is a combination of $^6$LiF and ZnS. For example, in various embodiments, neutron scintillator 110 is a commercially available screen material (Applied Scintillation Technologies, Harlow, United Kingdom), approximately 0.5 mm thick made from a mixture of LiF and ZnS. The lithium is isotopically enriched $^6$Li, an isotope with a cross section of 940 barns for capturing a thermal neutron and immediately breaking up into a helium nucleus $^4$He and a triton $^3$H, with a total energy release of 4.78 MeV. The energetic alphas and tritons can lose energy in the ZnS causing it to scintillate with the emission of about 50 optical photons for every kilovolt of energy lost as the alphas and tritons come to rest. There can thus be a high probability that each captured neutron produces hundreds of thousands of optical light quanta.

Preferably, optical guide 102 and the scintillator-optical guide 106 can be made of hydrogenous material that thermalizes fast neutrons making the apparatus a compact, efficient detector of fast neutrons.

Optional neutron moderator 116, made of a material that thermalizes fast neutrons, can be added to further increase the efficiency for detecting fast neutrons. One skilled in the art will know of many suitable moderator materials and can select a moderator material, thickness, and location to maximize neutron detection efficiency while minimizing any loss in efficiency for detecting gamma rays. For example, typical neutron moderators are hydrogenous materials such as water, organic solvents (alcohols, ethers (e.g., diethyl ether, tetrahydrofuran), ketones (e.g., acetone, methyl ethyl ketone), alkanes (e.g., hexane, decane), acetonitrile, N,N'dimethylformamide, dimethyl sulfoxide, benzene, toluene, xylenes, and the like) oils and waxes (e.g., mineral oil, paraffin, and the like), organic polymers (e.g., polyalkanes (e.g., polyethylene, polypropylene, and the like), polyesters, polyvinylenes (e.g., polyvinylchloride) polyacrylates (e.g., polymethymethacrylate), polystyrenes, polyalkylsiloxanes (e.g., poly dimethyl siloxane), and the like), composites or gels of water or organic solvents with polymers (e.g., water gels of gelatin, polyacrylic acid, hyaluronic acid, and the like), and many other such moderators known to the art.

For example, in some embodiments, moderator 116 can be made of an organic polymer, e.g., high density polyethylene, and can be placed over the apparatus 100 to moderate (thermalize) incoming fast neutrons, so that they can be efficiently captured by neutron scintillator 110. In other embodiments, moderator 116 can be a container that holds a suitably thick layer of a liquid moderator covering apparatus 100, for example, water, organic solvents, water gels, and the like. In various embodiments, the hydrogen nuclei in the neutron moderator can be enriched in the $^2$H isotope, i.e., the fraction of $^2$H in the moderator is above natural abundance level. In some embodiments, at least about 50%, more typically at least about 90%, or preferably at least about 95% of the hydrogen nuclei in the neutron moderator are the $^2$H isotope.

In addition to guiding scintillation photons to optical detectors 104 and 108, light guides 102 and 106 can optionally act as a moderators or thermalizers of the fast neutrons, thus slowing them to thermal energies so that they can be efficiently captured by neutron scintillator sheet 110. Thus, light guides 102 and 106 can include any neutron moderator described above that can meet the transparency criterion, e.g., typically hydrogenous materials such as water, organic solvents, transparent organic polymers (e.g., polyacrylics, polystyrenes, polycarbonates, polyalkylsiloxanes) composites or gels of water or organic solvents with polymers, mineral oil, and the like. Typically, the material of light guides 102 and 106 can be a solid, e.g., an organic polymer, generally a polyacrylate, e.g. in some embodiments, polymethyl methacrylate. In various embodiments, the hydrogen nuclei in the material of light guides 102 and 106 can be enriched in the $^2$H isotope, i.e., the fraction of $^2$H in the moderator is above natural abundance level. In some embodiments, at least about 50%, more typically at least about 90%, or preferably at least about 95% of the hydrogen nuclei in the neutron moderator are the $^2$H isotope.

Light guide 106 can include any of a variety of gamma ray scintillating materials 107 known in the art. Examples of such materials include sodium iodide doped with thallium (Na(Tl), cesium iodide doped with thallium (CsI(Tl)), bismuth germanate (BGO), barium fluoride (BaF$_2$), lutetium oxyorthosilicate doped with cesium (LSO(Ce)), cadmium tungstate (CWO), yttrium aluminum perovskite doped with cerium (YAP(Ce)), gadolinium silicate doped with cerium (GSO), and the like. For example, NaI(Tl) can be fast, efficient and inexpensive, but can be hygroscopic and is typically sealed against moisture. Non-hygroscopic crystals such as BaF$_2$, BGO or LSO, and the like, can also be employed. Such materials are typically selected to have good efficiency for detecting gamma rays from dirty bombs; for example, a 662 keV gamma ray from $^{137}$Cs (often cited as a radiological threat in a dirty bomb) can have more than an 80% absorption efficiency in a 2.5 cm (1 inch) thick crystal of LSO, which can produce about 10,000 detectable optical photons. Generally, the gamma ray scintillator includes one of NaI(Tl), CsI(Tl), BGO, BaF$_2$, LSO, or CdWO$_4$, or more typically, BGO, BaF$_2$, or LSO. In some embodiments, the gamma ray scintillator is BaF$_2$, and in other embodiments, the gamma ray scintillator is LSO.

Light guide 106 can be a hydrogenous scintillator such as a plastic scintillator or a liquid scintillator. Hydrogenous scintillators have very poor energy resolution of monoenergetic gamma rays and therefore are not suited for identifying gamma ray sources but they are well-suited and much used both to alert the presence of ionizing radiation and to give an accurate measure of the radiation dose, that is, the strength of the radiation flux.

Gamma-ray scintillating material 107 and light guide 106 can be transparent to the optical wavelengths generated by any of the scintillation events. As used herein, the terms "transparent" and "transparency" refer to the transmittance per unit path length in a material of light, e.g., scintillation light. Typically, a material transparent to scintillation light transmits, per meter of material, at least about 90%, generally about 95%, and more typically about 98% of scintillation. Typically, the scintillation transmitted is in a range from about 400 nanometers (nm) to about 600 nm, generally from about 350 to about 600 nm, or more typically from about 300 to about 600 nm. Thus, in some embodiments, transparent materials (e.g., the light guides, the gamma ray scintillator, and the like) transmit about 95%/meter of scintillation between about 350 nm and about 600 nm, or more typically, transmit about 98% of scintillation between about 300 nm and about 600 nm.

As noted above, neutron scintillator sheet 110 is substantially opaque, i.e. not transparent, with respect to optical photons generated by gamma ray scintillating material 107, thus blocking such photons from being detected by detector 104.

In various embodiments, the respective refractive indices of neutron scintillator sheet 110 and light guides 102 and 106 can be in the same range, e.g., between about 1.4 to about 2.4, or more typically, between about 1.5 to about 1.8, and can generally be selected to be similar to minimize reflections at the interface between scintillator 110 and light guides 102 and 106.

Figure 2:
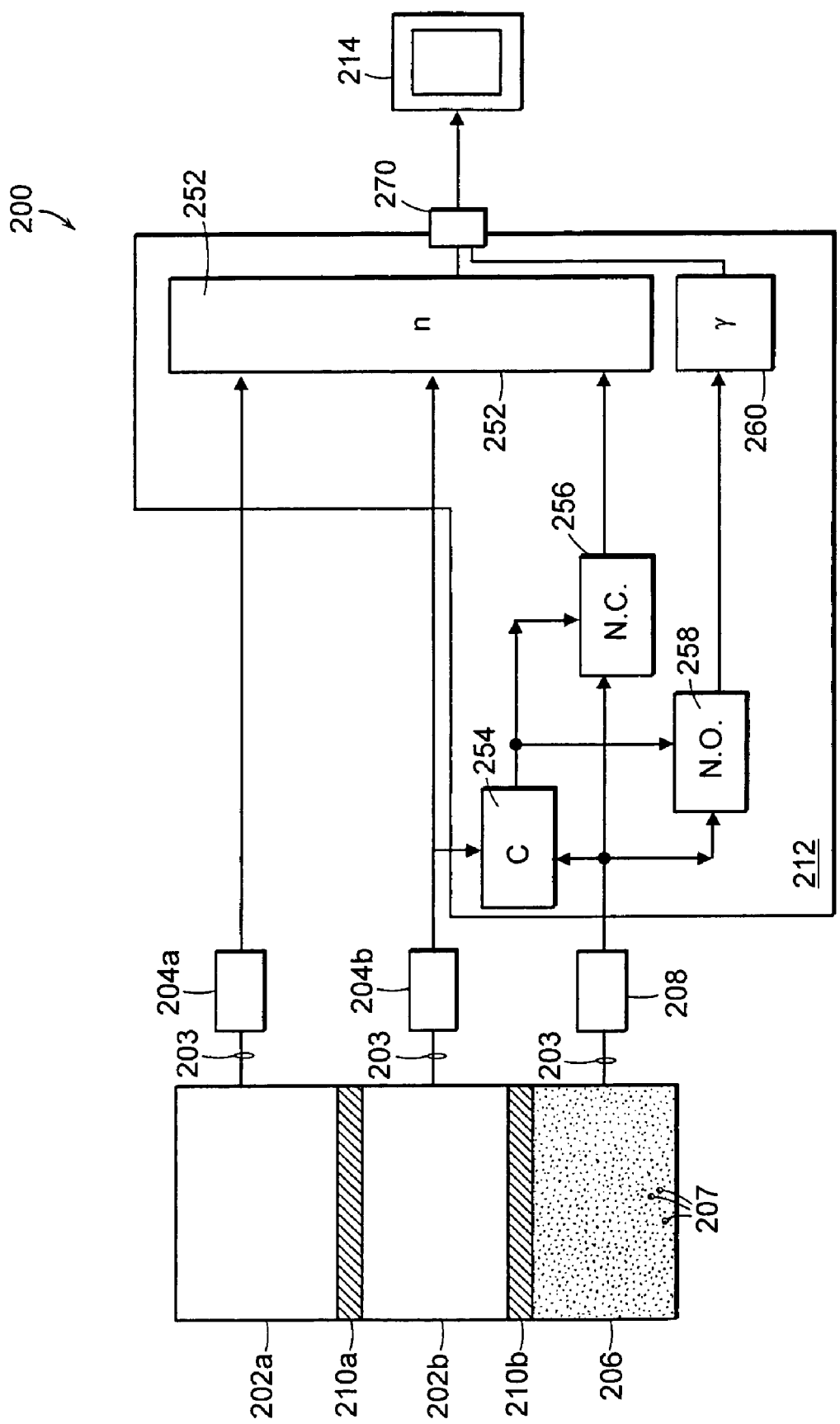
FIG. 2 is a schematic diagram of another embodiment of the device of the present invention.

An alternative embodiment of a device of the present invention is device 200 shown in FIG. 2. Device 200 comprises plural neutron scintillator sheets (as a non-limiting example, two neutron scintillators are shown, 210a through 210b) that interleave plural light guide plates (as a non-limiting example, three light guides plates are shown, 202a, 202b and 206). Similarly to light guide 106 of device 100 depicted in FIG. 1, light guide 206 comprises gamma ray scintillating material 207. Light guides 202a and 202b are optically coupled to optical detectors 204a and 204b, whereas light guide 206 is optically coupled to optical detector 208. Means for coupling light guides 202a, 202b and 206 to detectors 204a, 204b and 208 can optionally include optical fibers 203.

Detectors 204 and 208 can be coupled to processor 212 (shown here with superimposed logical scheme of its operation, explained below), which can provide data acquisition, control, and output. Output can be accomplished by display 214. Neutron scintillator sheets 210a and 210b are substantially opaque, i.e. not transparent, with respect to optical photons generated by gamma ray scintillating material 207, thus blocking such photons from being detected by detector 204.

The following is the logic of processor 212 employed during the operation of device 200.

If a neutron strikes neutron scintillator sheet 210a, then the optical photons generated by this event propagate through both light guides 202a and 202b and are detected by both detectors 204a and 204b. The signal from detectors 204a and 204b will propagate to "neutron detector" element 252, which will cause display driver 270 to generate a signal to be displayed on display 214 indicating that a neutron was detected.

If neutron strikes neutron scintillator sheet 210b, then the optical photons generated by this event propagate through both light guides 202b and 206 and are detected by both detectors 204b and 208. Presence of the signals from both detectors 204b and 208 will be detected by coincidence counter 254. Coincidence counter 254 will open "normally closed" gate 256, and will close "normally open" gate 258. The signal propagated from "normally closed" gate 256, will propagate to "neutron detector" element 252, which will cause display driver 270 to generate a signal to be displayed on display 214 indicating that a neutron was detected.

If a gamma ray strikes scintillating material 207 within light guide 206, then only detector 208 will generate a signal, which will propagate through "normally open" gate 258 to "gamma detector" element 260, which, in the absence of signal from "neutron detector" element 252, will cause display driver 270 to generate a signal to be displayed on display 214 indicating that a gamma ray was detected.

Figure 3:
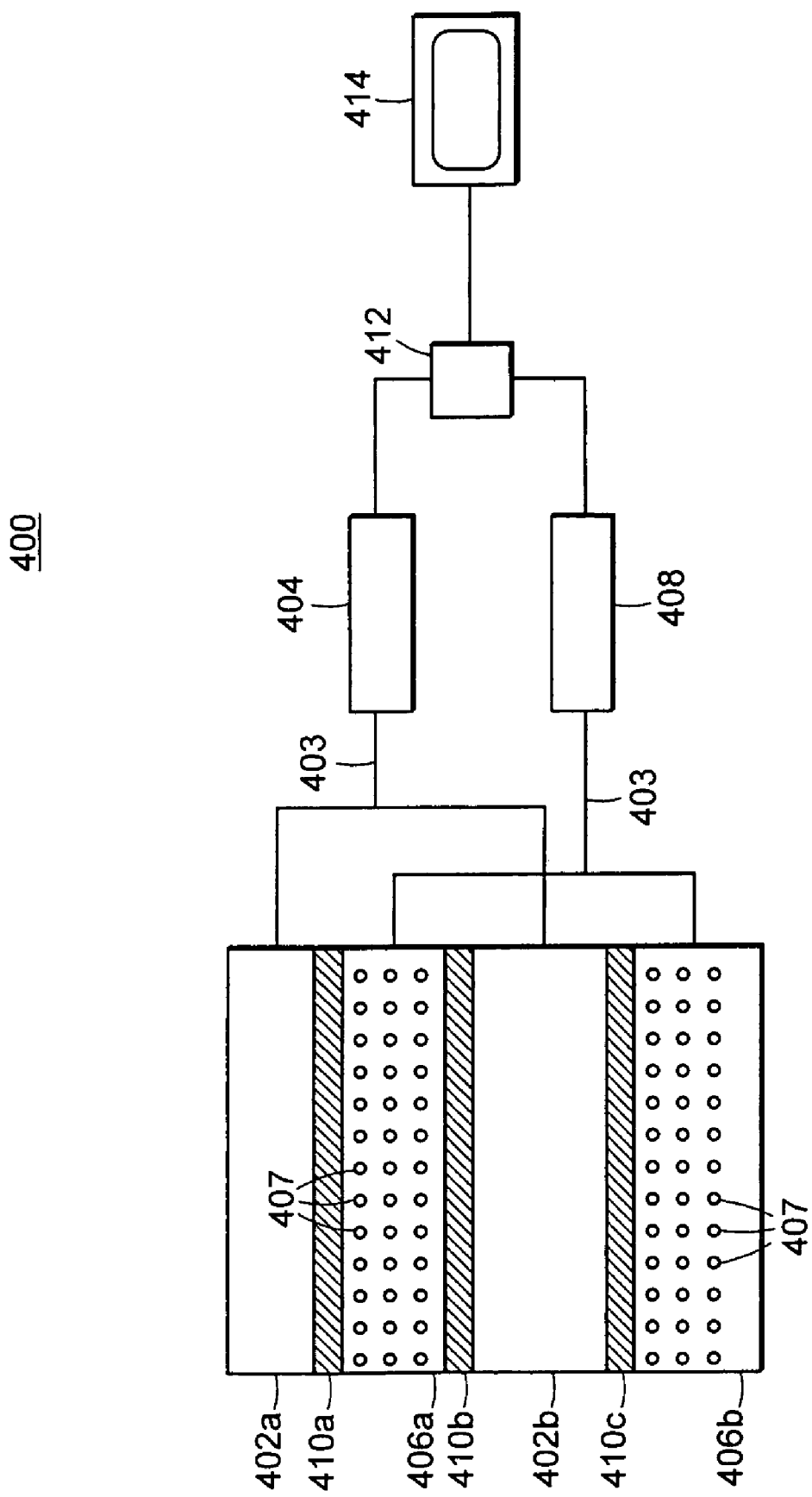
FIG. 3 is a schematic diagram of another embodiment of the device of the present invention.

Device 400, shown in FIG. 3, is an alternative embodiment of a device of the present invention. Device 400 comprises plural neutron scintillator sheets (as a non-limiting example, three neutron scintillators are shown, 410a through 410c) that interleave plural light guide plates (as a non-limiting example, four light guides plates are shown, 402a, 402b, 406a and 406b). Light guides 406a and 406b include gamma ray scintillating material 407. In device 400, light guides 402a and 402b interleaf light guides 406a and 406b. Neutron scintillator sheets 410a through 410c are substantially opaque, i.e. not transparent, with respect to optical photons generated by gamma ray scintillating material 407, thus blocking such photons from being detected by detector 404.

In the embodiment of device 400 shown in FIG. 3, light guides 402a and 402b are optically coupled to optical detector 404, while light guides 406a and 406b are optically coupled to optical detector 408. Means for optical coupling can include optional optical fibers 403. Processor 412 detects gamma rays if there is a signal from optical detector 408, but not from optical detectors 404. Output can be accomplished by display 414.

Figure 4:
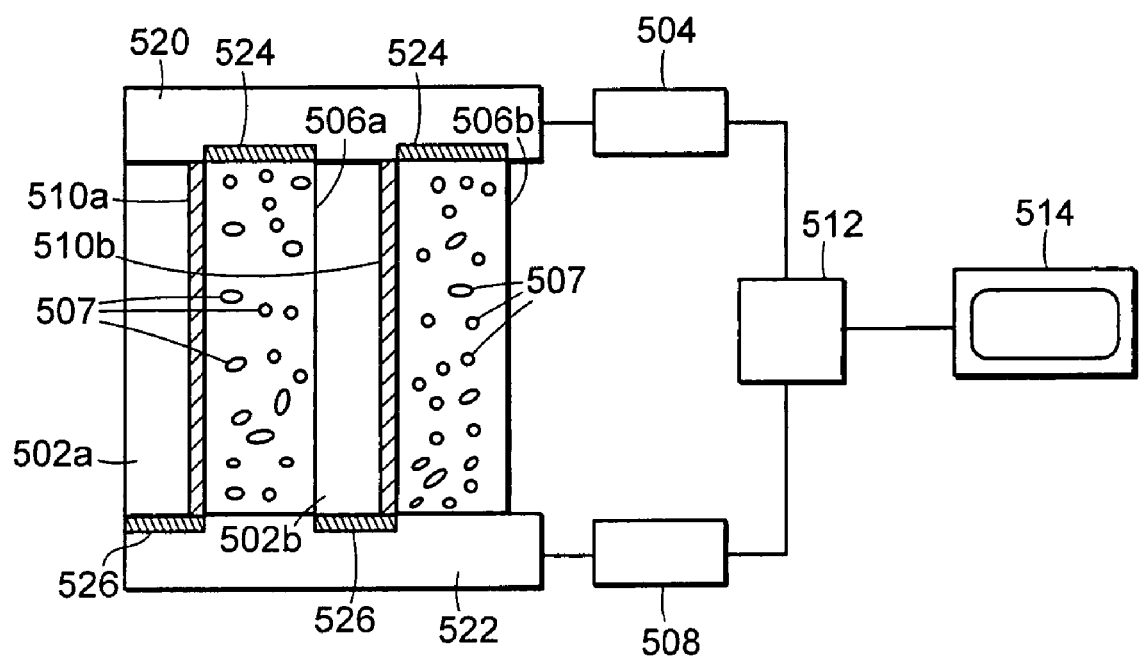
FIG. 4 is a schematic diagram of another embodiment of the device of the present invention.

Device 500, shown in FIG. 4, is an alternative embodiment of a device of the present invention. Device 500 comprises plural neutron scintillator sheets (as a non-limiting example, two neutron scintillators are shown, 510a and 510b) that interleave plural light guide plates (as a non-limiting example, four light guides plates are shown, 502a, 502b, 506a and 506b). Light guides 506a and 506b include gamma ray scintillating material 507. In device 500, light guides 502a and 502b interleaf light guides 506a and 506b. Neutron scintillator sheets 510a through 510d are substantially opaque, i.e. not transparent, with respect to optical photons generated by gamma ray scintillating material 507.

In the embodiment of device 500 shown in FIG. 4, light guides 502a and 502b are optically coupled to optical detector 504 via light guide 520, while light guides 506a and 506b are optically coupled to optical detector 508 via light guide 522. Photons from light guides 502a and 502b are prevented from entering light guide 522 by opaque members 526. Similarly, photons from light guides 506a and 506b are prevented from entering light guide 520 by opaque members 524. In one embodiment, opaque members 520 and 524 can be a reflective coating on light guides 502a, 502b, 506a and 506b.

Processor 512 detects gamma rays if there is a signal from optical detector 508, but not from optical detectors 504. Output can be accomplished by display 514.

As noted above, selectivity for neutrons over gamma rays can be essential for detecting neutron sources, e.g., plutonium, while minimizing false alarms from gamma ray sources. For example, one current security standard desires a neutron detector to detect the presence of 0.455 kg (1 pound) of plutonium at a distance of 2 meters. 0.455 kg (1 pound) of plutonium emits approximately 20,000 fast neutrons per second. At 2 meters, there are at most 0.04 neutrons crossing per $cm^2$ of the detector per second. If the efficiency for detecting the neutron is 50%, which can be attained by devices of the present invention, then the count rate is only $0.02/sec/cm^2$. If the efficiency of the neutron detector for detecting gamma rays is $10^{-3}$, then 20 gamma rays/sec/$cm^2$, from a modest source, will give the same signal as the neutrons from 0.455 kg (1 pound) of plutonium, and trigger an alert. Devices of the present invention with an efficiency for detecting gamma rays of only $2\times10^{-9}$ will typically not be misled by even strong gamma ray sources In fact, devices of the present invention will typically not detect a gamma ray source as equivalent to the neutron/plutonium security standard unless the gamma ray source is itself a serious health risk.

Devices of the present invention have other practical advantages over conventional $^3$He detectors. Commercial $^3$He detectors typically have only about 10% efficiency for detecting neutrons unless surrounded by a thick neutron moderator such as the 5 cm thick cover of high density polyethylene used in many commercial instruments. The disclosed neutron detectors, with intrinsic neutron moderation provided by the light guide, can have an efficiency of almost 40% without a high density polyethylene cover. Further, if necessary to achieve the efficiency of a fully moderated $^3$He detector, the disclosed neutron detectors can employ a much thinner external moderator (e.g., polyethylene) to obtain full moderation. Thus, the detectors disclosed herein can be significantly lighter than a commercial $^3$He detector of the same efficiency, which is of central importance for adapting a device to handheld use.

Also, devices of the present invention can be very robust and can be free of travel restrictions. A $^3$He detector contains the isotope $^3$He at a pressure typically from about two to about four atmospheres. In many situations, transportation regulations require special procedures for transporting such detectors.

Also, commercial $^3$He detectors are typically limited to an operating temperature range of from +10° C. to +50° C., where detection can still be affected by changes in temperature. Devices of the present inevntion can be insensitive to temperature change over a range of at least about −10° C. to about 50° C.

Still another advantage is that the disclosed detector, in sizes large enough to meet Homeland Security requirements, can be less costly than commercial $^3$He detectors of comparable efficiency because the cost of comparable materials, e.g., the neutron scintillation sheets, are typically much less expensive compared to the cost of $^3$He in a conventional detector.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for selective radiation detection, comprising:
   a first light guide, optically coupled to a first optical detector;
   a second light guide, optically coupled to a second optical detector, said second light guide comprising a gamma ray scintillator material;
   a sheet of neutron scintillator, opaque for incoming optical photons, said sheet of neutron scintillator sandwiched between the first and the second light guides; and
   a processor, coupled to the first and second optical detectors, configured to classify detected radiation as neutrons or gamma rays depending on whether signals generated by the first and second detectors are concident.

2. The apparatus of claim 1, wherein the light guides thermalize fast neutrons so that they are captured by the neutron scintillator, producing optical light.

3. The apparatus of claim 2, wherein the light guides comprise a hydrogenous material that thermalizes fast neutrons.

4. The apparatus of claim 3, wherein the light guide includes at least one material selected from water, organic solvents, mineral oil, and organic polymers.

5. The apparatus of claim 1, wherein the neutron scintillator comprises a thermal neutron capturing isotope component and a scintillation component that scintillates upon exposure of the capturing isotope to thermal neutrons.

6. The apparatus of claim 5, wherein the capturing isotope is selected from $^6$Li, $^{10}$B, $^{113}$Cd, and $^{157}$Gd.

7. The apparatus of claim 5, wherein the neutron scintillator comprises $^6$LiF and ZnS.

8. The apparatus of claim 1, wherein the gamma ray scintillator comprises a plastic scintillator or a liquid scintillator.

9. The apparatus of claim 1, wherein the gamma ray scintillator comprises a material selected from NaI(Tl), CsI(Tl), BGO, BaF$_2$, LSO, and CdWO$_4$.

10. The apparatus of claim 1, further comprising a display coupled to the processor to display radiation detection results.

11. The apparatus of claim 1, wherein the apparatus is adapted to be handheld.

12. The apparatus of claim 1, wherein plural neutron scintillator sheets interleave plural light guide plates.

13. The apparatus of claim 12, further comprising plural optical detectors optically coupled to the light guide plates.

14. A method for selectively detecting radiation, comprising the steps of:
exposing to radiation a device comprising:
a first light guide, optically coupled to a first optical detector;
a second light guide, optically coupled to a second optical detector, said second light guide comprising a gamma ray scintillator material;
a sheet of neutron scintillator opaque for incoming optical photons, said sheet of neutron scintillator sandwiched between the first and the second light guides; and
classifying detected radiation as neutrons or gamma rays depending on whether signals generated by the first and the second optical detectors are coincident.

15. The method of claim 14, wherein the detected radiation is classified as neutrons if coincidence of the signals from the first optical detector and the second optical detector is detected.

16. The method of claim 14, wherein the detected radiation is classified as gamma rays if the signal from the second optical detector is detected, but the signal from the first optical detector is not detected.

17. The method of claim 14, wherein the light guides thermalize fast neutrons so that they are captured by the neutron scintillator producing optical light.

18. The method of claim 17, wherein the light guide comprises a hydrogenous material that thermalizes fast neutrons.

19. The method of claim 14, further comprising displaying radiation detection results on a display coupled to a processor.

20. The method of claim 14, wherein the device is adapted to be handheld.

* * * * *

UNITED STATES PATENT AND TRADEMARK OFFICE
CERTIFICATE OF CORRECTION

PATENT NO. : 7,525,101 B2
APPLICATION NO. : 11/442638
DATED : April 28, 2009
INVENTOR(S) : Lee Grodzins It is certified that error appears in the above-identified patent and that said Letters Patent is hereby corrected as shown below:

Claim 1, column 8, line 62
replace "first and second detectors are concident"
with --first and second detectors are coincident--

Signed and Sealed this

Thirtieth Day of June, 2009

JOHN DOLL
*Acting Director of the United States Patent and Trademark Office*